United States Patent [19]

Stoffer et al.

[11] Patent Number: 4,971,497

[45] Date of Patent: Nov. 20, 1990

[54] FASTENER SYSTEM

[75] Inventors: Lewis J. Stoffer; Andrew MacGee, both of Cincinnati, Ohio

[73] Assignee: The United States of America as represented by the Secretary of the Air Force, Washington, D.C.

[21] Appl. No.: 487,488

[22] Filed: Mar. 2, 1990

[51] Int. Cl.$^5$ .............................................. F16B 37/04
[52] U.S. Cl. .................................. 411/108; 411/113; 411/178; 411/183; 411/339; 411/537
[58] Field of Search ............... 411/108, 112, 113, 178, 411/183, 338, 339, 432, 537

[56] References Cited

U.S. PATENT DOCUMENTS

| | | | |
|---|---|---|---|
| 157,618 | 12/1874 | Mantey | 411/178 X |
| 1,356,835 | 10/1920 | Spiro | 411/108 |
| 1,788,612 | 1/1931 | Benson | 411/338 X |
| 2,132,636 | 10/1938 | Maahs | 411/183 X |
| 2,234,557 | 3/1941 | Hungerford | 411/112 |
| 3,221,589 | 12/1965 | Vander Sande et al. | 411/338 |
| 4,244,661 | 1/1981 | Dervy | |
| 4,250,732 | 2/1981 | Moryl | 411/108 X |
| 4,348,140 | 9/1982 | Bergholz et al. | 411/112 X |
| 4,478,532 | 10/1984 | Puro | 411/338 |
| 4,490,083 | 12/1984 | Rerish | 411/338 |
| 4,609,315 | 9/1986 | Briles | |
| 4,659,272 | 4/1987 | Pratt | |
| 4,748,806 | 6/1988 | Drobny | |
| 4,765,787 | 8/1988 | Briles | |

FOREIGN PATENT DOCUMENTS

| | | | |
|---|---|---|---|
| 451759 | 10/1948 | Canada | 411/178 |
| 876408 | 11/1942 | France | 411/432 |

*Primary Examiner*—Neill R. Wilson
*Assistant Examiner*—Jerry Redman
*Attorney, Agent, or Firm*—Bobby D. Scearce; Donald J. Singer

[57] ABSTRACT

A flush mounting fastener system for threadably attaching a threaded member to a plate or shell structure is described which comprises in one representative embodiment an internally threaded bushing flanged on a first end for attachment to the housing within a hole of preselected size in the housing, a plurality of circumferentially spaced crenelations of preselected size and spacing on the second end of the bushing, an insert threaded on the outer surface for threadably engaging the bushing and on the inner surface for threadably attaching a threaded member to the housing structure, and a plurality of tangs on one end of the insert corresponding in size and spacing with the spaced crenelations in the bushing and being radially outwardly bendable into spaces between the crenelations to lock the insert within the bushing. In a second representative embodiment, an annular flange is defined on the end of the bushing opposite the crenelations and a ball nut is disposed within the bushing and supported on the annular flange, the ball nut having a threaded diametric hole for receiving the threaded member and a pair of diametrically oppositely disposed protrusions, and wherein the threaded insert has two diametrically opposed axial slots near the first end for engaging the protrusions of the ball nut and restraining the ball nut from rotation about its threading axis but permitting rotation within predetermined limits about an axis containing the protrusions and an axis orthogonal thereto, whereby a threaded member having a threading axis non-coaxial with the axis of the insert may be threadably received by the ball nut.

11 Claims, 3 Drawing Sheets

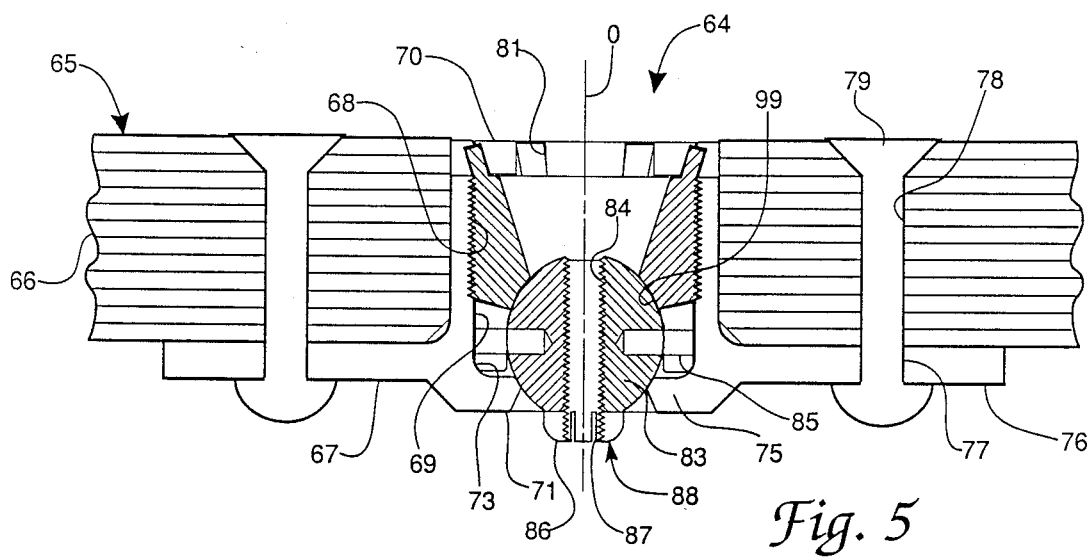
Fig. 5
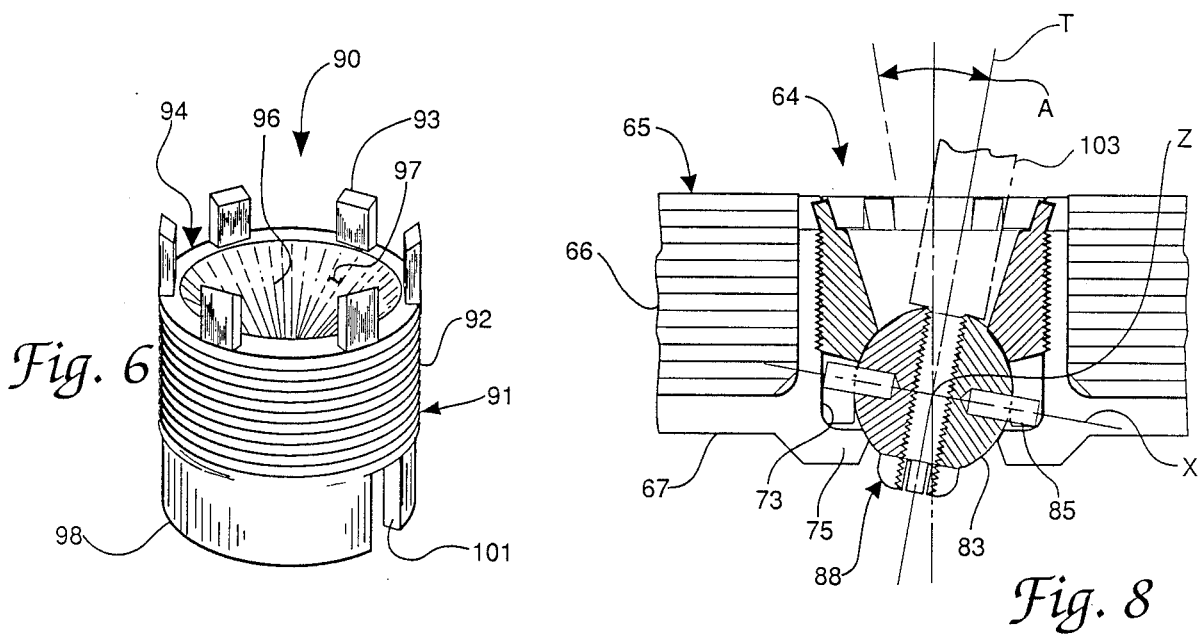
Fig. 6
Fig. 8
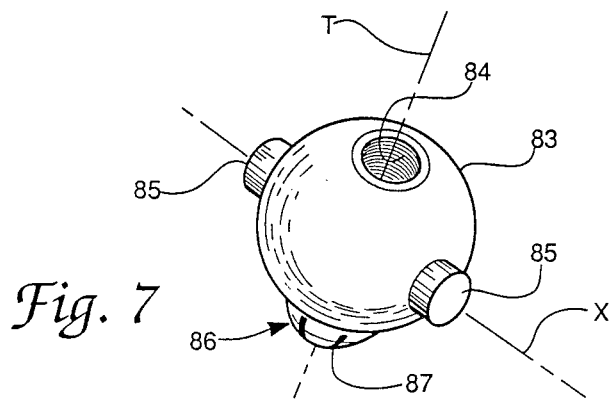
Fig. 7

FASTENER SYSTEM

RIGHTS OF THE GOVERNMENT

The invention described herein may be manufactured and used by or for the Government of the United States for all governmental purposes without the payment of any royalty.

BACKGROUND OF THE INvENTION

The present invention relates generally to fasteners for plate material, and more particularly to a fastener system especially suited for composite plate or shell materials.

Existing commercially available fasteners are configured to withstand higher point loading than composite materials ordinarily can withstand, and generally require accessibility to both sides of the housing structure to which it is attached.

The invention disclosed herein comprises a fastener system for plate material and which is especially suited for mounting accessories to a housing constructed of composite laminate material. The fastener system of the invention is configured to be substantially flush with the surface of the housing in which it is disposed, yet provides convenient and structurally reliable means for attachment of an accessory to the housing. When not in use, the invention presents a smooth, streamlined surface on the housing, and therefore finds substantial utility for mounting of accessories to an engine housing, airfoil, fuselage or other surface to which flush mounting means is particularly desirable.

The invention includes an internally threaded flanged bushing insertable into a hole in the housing to which the fastener is applied and riveted thereto, and an internally and externally threaded insert within the bushing and presenting the internal threads thereof for attachment of a member to the housing. Tangs on the outwardly disposed end of the insert are bendable radially outwardly into spaces between crenelations in the outward end of the bushing to prevent the insert from inadvertently backing out of the bushing as a result of vibration or other applied force. The insert is replaceable without accessing the inner side of the housing structure. In a separate embodiment of the invention, a ball having a pair of protrusions and a diametric threaded hole is held within a flanged bushing by a slotted threaded insert such that the ball can rotate within prescribed limits about an axis containing the protrusions to accommodate off-axis or skewed mounting of a member to the housing, but is restrained against rotation about the axis of the insert. Both the ball and insert are easily removable from the bushing for replacement.

It is a principal object of the invention to provide an improved flush mounting fastener system.

It is another object of the invention to provide a flush mounting fastener system for plate material.

It is a further object of the invention to provide a flush mounting fastener system for accommodating a threaded attaching member having an off-center, skewed or variable axis.

These and other objects of the invention will become apparent as a detailed description of representative embodiments proceeds.

SUMMARY OF THE INVENTION

In accordance with the foregoing principles and objects of the invention a flush mounting fastener system for threadably attaching a threaded member to a plate or shell structure is described which comprises in one representative embodiment an internally threaded bushing flanged on a first end for attachment to the housing within a hole of preselected size in the housing, a plurality of circumferentially spaced crenelations of preselected size and spacing on the second end of the bushing, an insert threaded on the outer surface for threadably engaging the bushing and on the inner surface for threadably attaching a threaded member to the housing structure, and a plurality of tangs on one end of the insert corresponding in size and spacing with the spaced crenelations in the bushing and being radially outwardly bendable into spaces between the crenelations to lock the insert within the bushing. In a second representative embodiment, an annular flange is defined on the end of the bushing opposite the crenelations and a ball nut is disposed within the bushing and supported on the annular flange, the ball nut having a threaded diametric hole for receiving the threaded member and a pair of diametrically oppositely disposed protrusions, and wherein the threaded insert has two diametrically opposed axial slots near the first end for engaging the protrusions of the ball nut and restraining the ball nut from rotation about its threading axis but permitting rotation within predetermined limits about an axis containing the protrusions and an axis orthogonal thereto, whereby a threaded member having a threading axis non-coaxial with the axis of the insert may be threadably received by the ball nut.

DESCRIPTION OF THE DRAWINGS

The invention will be more clearly understood from the following detailed description of representative embodiments thereof read in conjunction with the accompanying drawings wherein:

FIG. 5–8 illustrate an embodiment of the invention for accommodating an off-center, skewed or variable threading axis.

DETAILED DESCRIPTION

Figure 1A:
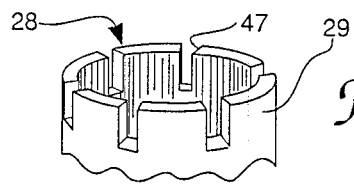
FIG 1a is a perspective view of the crenelated end of the flanged bushing of the FIG. 1 embodiment.
Figure 1:
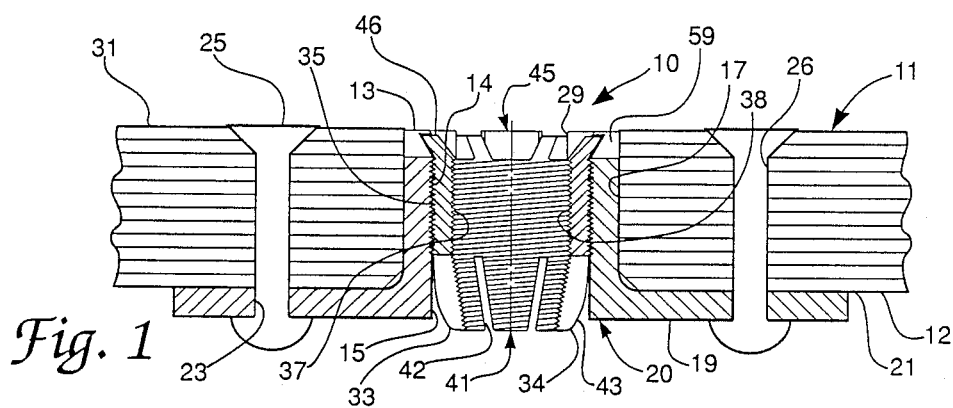
FIG. 1 is a view in axial section of a representative externally flush fastener according to the invention.
Figure 2:
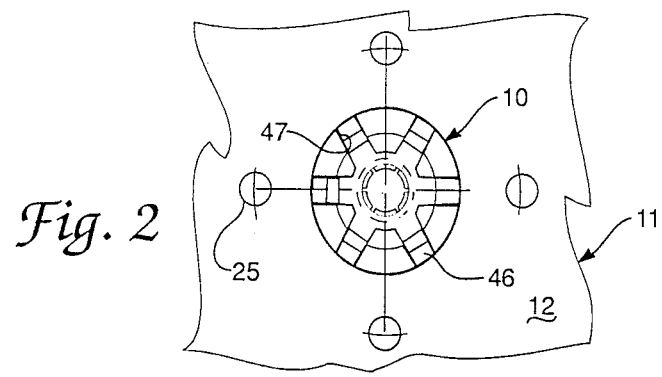
FIG. 2 is top view of the FIG. 1 embodiment.

Referring now to the drawings, FIG. 1 shows a view in axial section of a representative externally flush fastener 10 of the invention installed in a section 11 of plate or shell material 12. It is noted that fastener 10 is best suited for use in a section 10 comprising composite laminate material, although, as would occur to the skilled artisan, fastener 10 may also be applied to plate materials of other descriptions. FIG. 2 shows a plan view of fastener 10 as installed in section 11.

Fastener 10 comprises a circularly shaped flanged bushing 13 of preselected inner and outer diameters and having internal threads 14 defined on the inner surface 15 thereof as suggested in FIG. 1. Hole 17 through section 11 is sized for snugly receiving bushing 13. Circular flange 19 is defined at first end 20 thereof for placement against the inner surface 21 of section 11, i.e. the side opposite that to which attachment to section 11 is intended utilizing fastener 10. Flange 19 has a plurality of holes 23 sized for receiving a corresponding plurality of bolts or rivets 25, and section 11 has the same plurality of holes 26 for receiving rivets 25 in attaching bushing 13 to section 11. On second end 28 of bushing 13 is defined a plurality of circumferentially spaced crenelations 29 of selected size and spacing which serve a function described hereinafter. Insert 13 is sized in length to extend just below outer (upper) surface 31 of section 11 as suggested in FIG. 1, in order to allow substantially flush attachment of an element at surface 31. Overall length of bushing 13 is therefore substantially dictated by the thickness of section 11 into which fastener 10 is inserted.

Bushing 13 and other component parts of fastener 10 herein described may comprise any suitable material, such as a metal or alloy or a nonmetallic material such as plastic, nylon, composite or other material depending somewhat on material selection for section 11 and on the specific application for which section 11 and fastener 10 is used. It is noted further that the various parts of fastener 10 need also not consist of the same material. Though size is not considered a limitation on the invention, it is noted that fastener 10 of the invention as exemplified in the various embodiments described herein and as would occur to the skilled artisan guided by these teachings, may best be applied to plate material comprising section 11 of from 0.1 to 1 inch in thickness, and may include bushing 13 having an overall diameter of from about 0.5 to 1.5 inches.

A replaceable threaded insert 33 has on outer surface 34 thereof threaded portion 35 for threadably engaging threads 14 of bushing 13. Inner surface 37 of insert 33 has threads 38 for engaging a correspondingly threaded member (not shown) intended for attachment to section 11 in accordance with the principal purpose of the invention. Insert 33 is sized to be threadably inserted into bushing 13 to the position illustrated in FIG. 1 substantially flush with second end 28 of bushing 13 so that outer surface 31 of section 11 remains free of protuberances with fastener 10 in place.

Insert 33 optionally has at first end 41 a plurality of axial slots 42, and may be otherwise suitably formed to define self locking threaded portion 43 for firmly but removeably retaining a threaded attaching member. Second end 45 of insert 33 has a plurality of circumferentially spaced, radially outwardly bendable locking tangs 46, corresponding in size and number to the plurality of crenelations 29 in bushing 13. Insert 33 is configured so that when it is fully threaded into bushing 13, tangs 46 may be spread radially outwardly by suitable means into spaces 47 defined between crenelations 29 to lock insert 33 within bushing 13 against removal as by vibration or the like, and, further, to prevent insert 33 from being jammed into bushing 13 upon insertion of an attaching member to fastener 10 or from being removed from bushing 13 upon removal of the attaching member. Further, threads 14 may be defined on surface 15 of bushing 13 to limit the extent to which insert 33 can be threaded into bushing 13.

Figure 3:
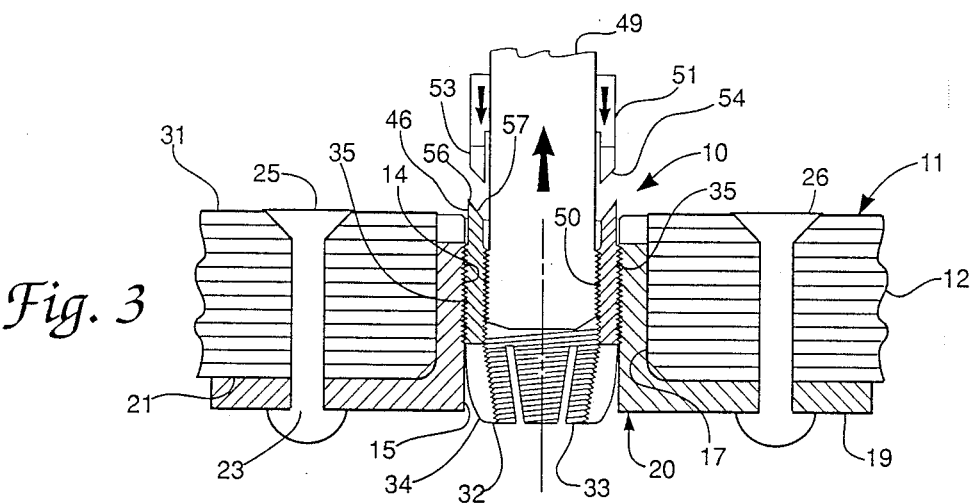
FIG. 3 illustrates means for installing the FIG. 1 embodiment.

Referring now to FIG. 3, shown therein is a sectional view of section 11 with bushing 13 and insert 33 of the invention with tangs 6 in a straightened (unbent) condition to illustrate a representative tang 46 configuration and corresponding bending method in the practice of the invention. In order to bend tangs 46 radially outwardly to a preselected extent, rod shaped member 49 of suitable diametric size may be provided with a threaded end portion 50 for threadably engaging insert 33. A tubular shaped tool 51 is slideably disposed on member 49 substantially as shown in FIG. 3. One end 53 of tool 51 is provided with a bevel 54 for engaging tangs 46 when tool 51 is forced downwardly (as FIG. 3 is viewed) against tangs 46. Tangs 46 may preferably include on the distal ends 56 thereof bevels 57 which facilitate the radially outwardly bending of tangs 46 upon engagement therewith of tool 51. In the bent condition for tangs 46 as suggested in FIG. 1, a space 59 remains between the radially outermost point of tangs 46 and the inner surface defining hole 17 in section 11 so that a tool may be inserted for straightening tangs 46 in the removal of insert 33 for replacement as suggested below in relation to FIG 4. For substantially identically configured inserts 33, this method provides reproducibility in bending tangs 46 in the installation of fastener 10 according to the invention.

Figure 4:
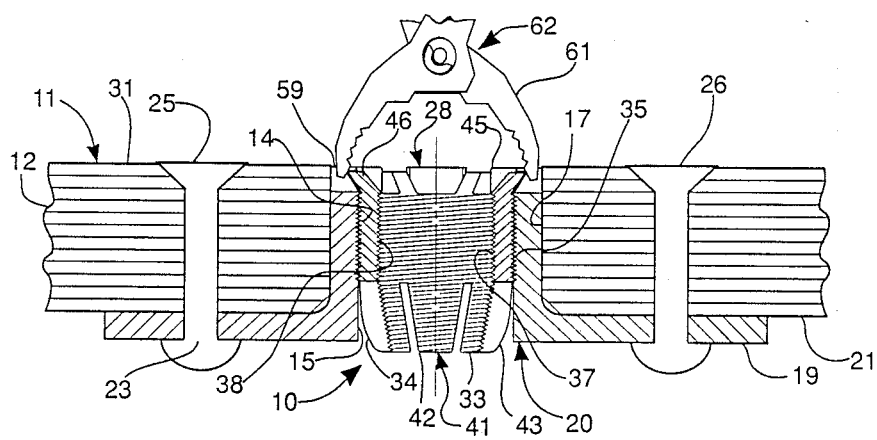
FIG. 4 illustrates means for removing the FIG. 1 embodiment.

Referring now to FIG. 4, it is seen that removal of insert 33 from bushing 13, such as for replacement, may be accomplished by gripping the edges of tangs 46, between the jaws 61 of a pair of pliers 62 or the like, straightening tangs 46 substantially to the condition shown in FIG. 3, and then threadably removing insert 33 from bushing 13. As suggested above, spaces 59 facilitate the insertion of jaws 61 in the removal procedure for insert 33.

Referring now collectively to FIGS. 5–8, shown therein is a representative arrangement for a fastener 64 according to the invention which may accommodate an off-center, skewed or variable bolt axis for attaching a member to section 65 of plate or shell material 66 of like configuration and composition to that of section 11 and material 12 of the FIGS. 1–5 embodiment.

Flanged bushing 67 is of similar construction and function as bushing 13 of the FIG. 1 embodiment, except that threads 68 extend part way along inner surface 69 from crenelations 70 toward first end 71 of bushing 67, and an enlargement 73 is defined by inner surface 69 of bushing 67 and annular flange 75. Flange 76, holes 77, 78, rivets 79, crenelations 70, and spaces 81 may be substantially identical in structure and function as similarly named components of the FIG. 1 embodiment. As with bushing 13 of the FIG. 1 embodiment, bushing 67 is sized in overall length according to the thickness of section 65.

The embodiment of FIGS. 5–8 is configured to receive an off-center, skewed or variable threading axis for a threaded member attached to section 65 using fastener 64. Accordingly, ball nut 83 is configured with a threaded diametric hole 84 of preselected size for receiving a threaded attaching member (shown in phantom in FIG. 8). Ball nut 83 further has a pair of diametrically oppositely disposed protrusions or torque pins 85 and defined along axis X perpendicular to axis T of threaded hole 84. Ball nut 83 is sized to be received by enlargement 73 of bushing 67 and be supported therein by annular flange 75. Ball nut 83 may optionally include at the depending end thereof (as FIG. 5 is viewed), an extension 86 including a plurality of axial slots 87 and be suitably formed to define self locking portion 88 for firmly but removeably retaining a threaded attaching member, similar to self locking portion 43 of the FIG. 1 embodiment.

Referring now collectively to FIGS. 5 and 6, threaded insert 90 of fastener 64 has on outer surface 91 thereof threaded portion 92 and is otherwise sized to be threadably received by bushing 67 as shown in FIG. 5. A plurality of tangs 93 defined on end 94 function similarly to tangs 46 of the FIG. 1 embodiment and are bendable radially outwardly into spaces 81 between crenelations 70 in the installed condition within bushing 67. The inner wall 96 of insert 90 defines near end 94 a conical surface 97 which terminates between end 94 and end 98 in a generally spherical shaped enlargement 99 sized and configured to restrain ball nut 83 within enlargements 73,99 and flange 75, such that ball nut 83 is rotatable within predetermined limits defined below. Insert 90 includes near end 98 thereof a pair of diametrically opposed axial slots 101 sized to engage pins 85 of ball nut 83 in the assembled condition. In the assembled condition, ball nut 83 is restrained from rotation about its threading axis T (and about central axis 0 of bushing 67 and insert 90), but can rotate about axis X containing pins 85 and an orthogonal axis Z (perpendicular to the plane of FIG. 8) within limits defined by the structure defining enlargements 73,99 and flange 75. FIG. 8 illustrates axis T of ball nut 83 rotated about axis Z to a limit defined by the structure of the component parts of fastener 64. With a threaded attachment member 103 (shown in phantom) installed in fastener 64, ball nut 83 may be rotated about axes X,Z within limits defined by conical surface 97. It is noted that angle A defined in the structure of fastener 64 by conical surface 97 within which axis T of ball nut 83 may be disposed in attaching a threaded member 103 may be selected by one practicing the invention in accordance with the requirements of a particular application. For section 65 thicknesses normally encountered, especially in composite laminate structures, viz, from about 0.25 to 1 inch, fastener 64 configurations may ordinarily accommodate a solid angle A thereof ranging from about 0° to 30°.

The invention therefore provides an improved fastener which is particularly applicable to composite plate or shell material. It is understood that modifications to the invention may be made as might occur to one with skill in the field of the invention within the scope of the appended claims. All embodiments contemplated hereunder which achieve the objects of the invention have therefore not been shown in complete detail. Other embodiments may be developed without departing from the spirit of the invention or from the scope of the appended claims.

We claim:
1. A flush mounting fastener system for threadably attaching a threaded member to a housing structure of plate or shell material, comprising:
  (a) a flanged bushing having a first end and a second end and preselected inner and outer diameters, the inner surface thereof defined by said inner diameter having a first set of threads thereon, said bushing sized on said outer diameter for insertion into a hole of preselected size in said housing and sized on the length thereof to correspond substantially to the thickness of said housing;
  (b) a circular flange on said first end of said bushing, said flange including a plurality of holes for receiving a corresponding plurality of rivets providing means for attachment of said bushing to said housing;
  (c) a plurality of circumferentially spaced crenelations of preselected size and spacing defined on said second end of said bushing;
  (d) a threaded insert having a first end and a second end, and having on the outer surface thereof a second set of threads for engaging said first set of threads in said bushing, and a third set of threads on the inner surface thereof for receiving said threaded member for attachment to said housing; and
  (e) a plurality of radially outwardly bendable tangs on said second end of said insert, said tangs being sized and circumferentially spaced on said second end in correspondence with said spaced crenelations of said bushing whereby said tangs are bendable radially outwardly into the spaces defined between said crenelations with said insert threaded into said bushing.

2. The fastener system of claim 1 further comprising a plurality of axial slots in said first end of said insert and wherein said first end is formed to define a self locking threaded portion for firmly retaining said threaded member.

3. The fastener system of claim 1 wherein said bushing and said insert comprise a material selected from the group consisting of metal, alloy, plastic, nylon and composite.

4. The fastener system of claim 1 wherein said bushing has overall length of from about 0.25 to 1 inch and outer diameter of from about 0.5 to 1.5 inches.

5. The fastener system of claim 1 wherein each of said tangs include on the distal end thereof a bevel for facilitating the radially outwardly bending thereof.

6. A flush mounting fastener system for threadably attaching a threaded member to a housing structure of plate or shell material, comprising:
  (a) a flanged bushing having a first end and a second end and preselected inner and outer diameters, the inner surface thereof defined by said inner diameter having a first set of threads thereon, said bushing sized on said outer diameter for insertion into a hole of preselected size in said housing and sized on the length thereof to correspond substantially to the thickness of said housing;
  (b) a circular flange on said first end of bushing, said flange including a plurality of holes for receiving a corresponding plurality of rivets providing means for attachment of said bushing to said housing;
  (c) a plurality of circumferentially spaced crenelations of preselected size and spacing defined on said second end of said bushing;
  (d) an annular flange on said first end of said bushing, said annular flange and said inner surface of said bushing defining an enlargement within said bushing near said first end thereof;
  (e) a ball nut having a threaded diametric hole of preselected size defined along a first axis for receiving said threaded member and a pair of diametrically oppositely disposed protrusions on the outer surface thereof and disposed along a second axis substantially orthogonal to said first axis, said ball nut being sized to be received by said enlargement within said bushing and to be supported therein by said annular flange;
  (f) a threaded insert having a first end and a second end, and having on the outer surface thereof a second set of threads for engaging said first set of threads in said bushing, said insert having an inner wall defining a conical surface near said second end, said conical surface terminating intermediate said first and second ends of said insert in a generally spherical shaped surface partially defining said enlargement within said bushing;

(g) said insert including at the first end thereof a pair of diametrically opposed axial slots sized to engage said protrusions of said ball nut with said ball nut disposed within said enlargement, whereby said ball nut is restrained from rotation about a central axis of said insert and is rotatable within predetermined limits about said first axis and about a second axis orthogonal to said first axis and said central axis, whereby said threaded member having a threading axis non-coaxial with said central axis may be threadably received by said ball nut; and (h) a plurality of radially outwardly bendable tangs on said second end of said insert, said tangs being sized and circumferentially spaced on said second end in correspondence with said spaced crenelations of said bushing whereby said tangs are bendable radially outwardly into the spaces defined between said crenelations with said insert threaded into said bushing.

7. The fastener system of claim 6 further comprising a threaded axial extension thereon along said first axis, said extension including a plurality of axial slots therein and being formed to define a self locking threaded portion for firmly retaining said threaded member.

8. The fastener system of claim 6 wherein said bushing, ball nut and said insert comprise a material selected from the group consisting of metal, alloy, plastic, nylon and composite.

9. The fastener system of claim 6 wherein said bushing has overall length of from about 0.25 to 1 inch and outer diameter of from about 0.5 to 1.5 inches.

10. The fastener system of claim 6 wherein each of said tangs include on the distal end thereof a bevel for facilitating the radially outwardly bending thereof.

11. The fastener system of claim 6 wherein said conical surface defines a solid angle of from 0° to 30°.

* * * * *